(12) United States Patent
Smith et al.

(10) Patent No.: US 7,474,740 B1
(45) Date of Patent: Jan. 6, 2009

(54) INTERACTIVE VOICE-ACTIVATED RESERVATION SYSTEM AND METHOD

(75) Inventors: Carline A. Smith, Roanoke, TX (US); Laura M. Therminy, Fort Worth, TX (US); Margaret M. Brown, Watauga, TX (US); Suzanne J. Kitchen, Hurst, TX (US)

(73) Assignee: American Airlines, Inc., Fort Worth, TX (US)

( * ) Notice: Subject to any disclaimer, the term of this patent is extended or adjusted under 35 U.S.C. 154(b) by 762 days.

(21) Appl. No.: 10/927,342

(22) Filed: Aug. 26, 2004

(51) Int. Cl.
H04M 1/64 (2006.01)
(52) U.S. Cl. ............... 379/88.02; 340/825.28; 379/265.09; 704/275; 705/51
(58) Field of Classification Search .............. 379/88.02, 379/88.17, 265.09; 704/275; 705/5; 340/825.28
See application file for complete search history.

(56) References Cited

U.S. PATENT DOCUMENTS

| | | | |
|---|---|---|---|
| 6,240,448 B1 | 5/2001 | Imielinski et al. | |
| 6,847,712 B2* | 1/2005 | Mashimo et al. | 379/265.09 |
| 7,047,197 B1* | 5/2006 | Bennett | 704/275 |
| 2002/0122541 A1* | 9/2002 | Metcalf | 379/88.02 |
| 2006/0277078 A1* | 12/2006 | Ohmori et al. | 705/5 |

\* cited by examiner

*Primary Examiner*—Gerald Gauthier
(74) *Attorney, Agent, or Firm*—Haynes and Boone, LLP

(57) ABSTRACT

An automated method comprises receiving a telephone call from a user, providing a voice prompt for a unique identifier associated with a reservation, receiving the unique identifier and looking up reservation information associated therewith, receiving a voice identification of change desired, and changing reservation information in response to the voice identification of change desired.

39 Claims, 2 Drawing Sheets

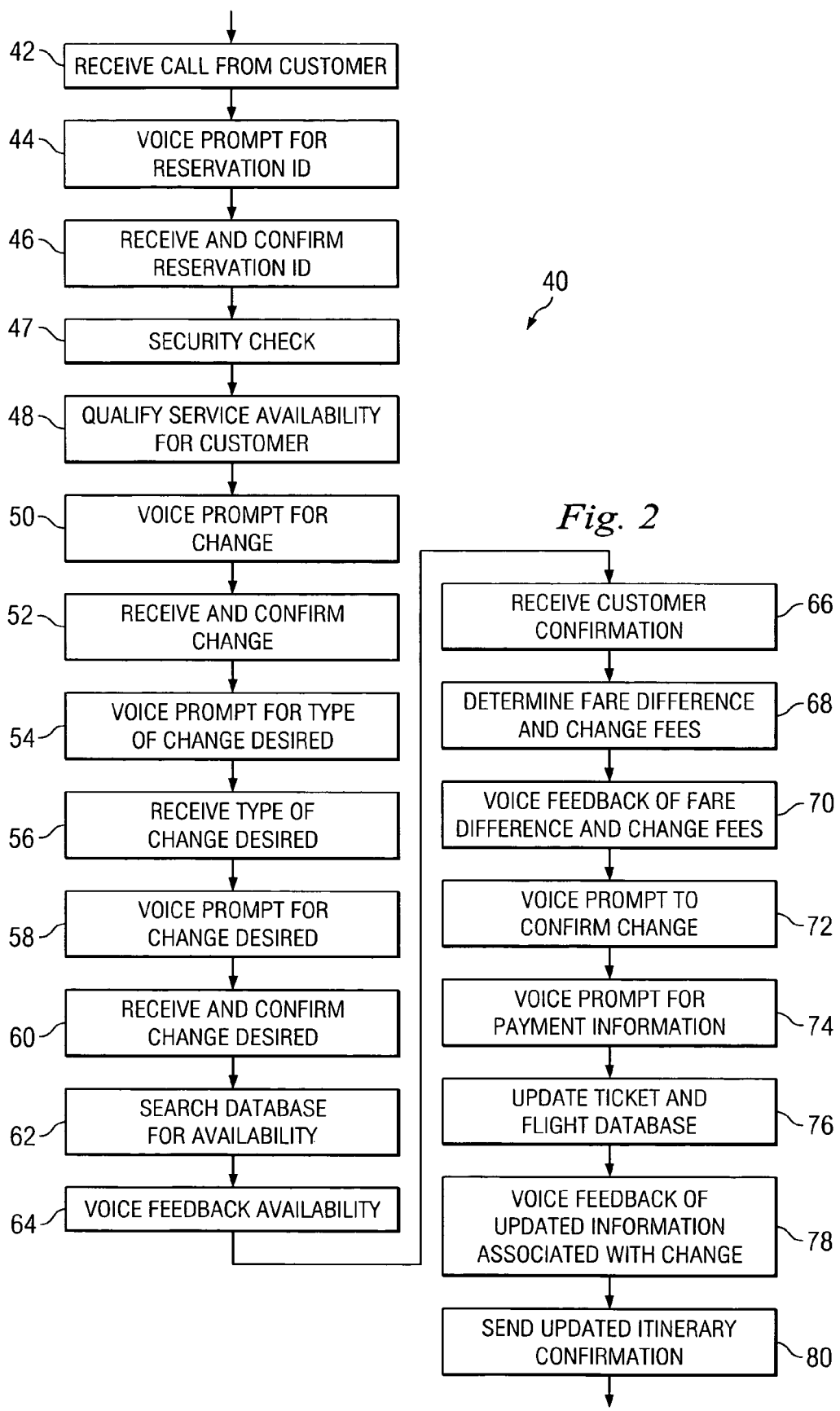

INTERACTIVE VOICE-ACTIVATED RESERVATION SYSTEM AND METHOD

BACKGROUND

The telephone has long been a preferred customer interface for many businesses. Using a telephone, customers may call a company to obtain needed information. A dedicated personnel may be employed by these companies to answer customer telephone calls. Other companies went a step further and automated this telephone interface with voice-recognition software so that the customer may call on any day and at all hours of the day and night. These automated telephone interfaces are able to provide customers with general information and in some instances provide specific information regarding specific accounts to the customers.

In particular in the airline industry, airline operators have been providing a voice-recognition telephone interface to their customers for inquiries of flight departure and arrival information, for example. Customers may be supplied with the departure time and gate information of particular flights out of an airport, for example. Customers may also get updates on whether a flight is on time, delayed or has been canceled.

BRIEF DESCRIPTION OF THE DRAWINGS

FIG. 2 is a simplified flowchart of an embodiment of interactive voice-activated reservation method.

DETAILED DESCRIPTION

Figure 1:
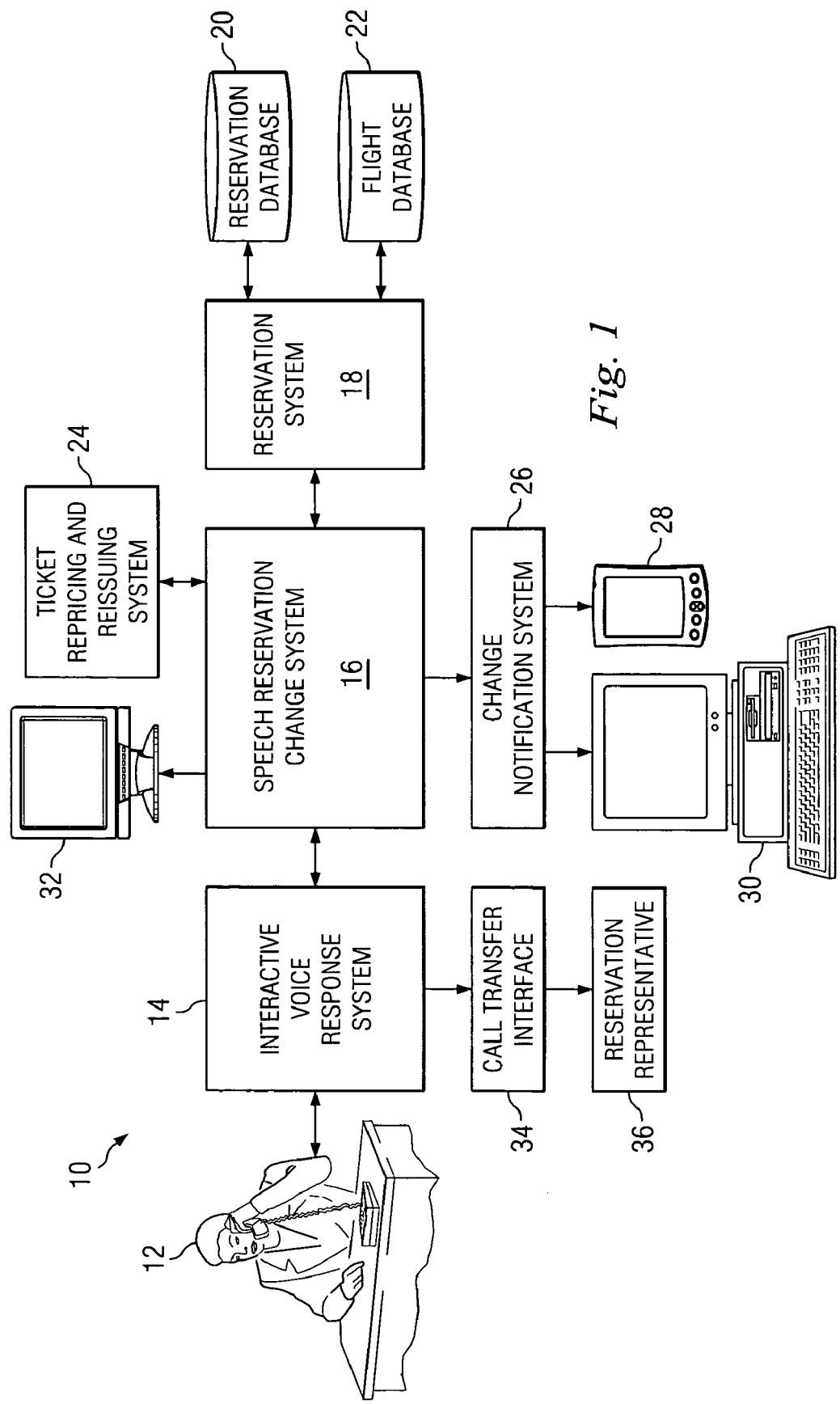
FIG. 1 is a simplified block diagram of an embodiment of interactive voice-activated reservation system.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and others.

Because service-oriented companies have a desire to provide service whenever and wherever the customers need it, the automated voice-interactive telephone interface has been a preferred customer interface. However, a customer's need to access specific information regarding his/her own reservation and to alter information related to his/her own reservation during these telephone sessions have been heretofore unanswered. For example, it is desirable to provide an interactive voice-activated system operable to permit a passenger to change his/her reservations without restrictions to geography or time zones using the telephone interface.

FIG. 1 is a simplified block diagram of an embodiment of an interactive voice-activated reservation system 10 that enables passengers to change certain aspects of his/her reservations. For example, a customer 12 may use system 10 to change the date of his return flight for a certain trip. Customer 12 may call a special telephone number designated for accessing system 10 which may be a toll-free number. An interactive voice response system 14 answers the telephone call from the customer and provides an automated audio greeting and menu for the customer to navigate and select the services desired. Interactive voice response system 14 uses voice-recognition technology to receive and process verbal inputs, but may also accept dual-tone multi-frequency (DTMF) input. Preferably, system 14 is operable to recognize a wide range of utterances and slang in common usage, as well as having the ability to overcome differences in regional and/or national accents. Interactive voice response system 14 thus translates the user spoken input to an electronic format that is comprehensible to the rest of system 10 and also provide audio feedback and confirmation to the caller.

The customer input and selections are provided to a speech reservation change system 16 that further interfaces with a reservation system 18. Speech reservation change system 16 receives customer input and makes appropriate updates and/or changes to data stored in a reservation database 20 using reservation system 18. Reservation database 20 is a data storage device that stores and maintains data related to customer reservations. For example, reservation database may include data records having a plurality of data fields to store names of passengers, reservation identifiers, passenger identification numbers, flight numbers, travel dates, departure and arrival cities, ticket type, special customer requirements (e.g., dietary), ticket restrictions, train reservation, tour reservation, cruise reservation, hotel reservation, rental car reservation, and fares. Reservation system 18 also has access to a flight database 22 that stores and maintains data related to flights. For example, flight database 22 may include, but not limited to, data fields to store flight numbers, dates, aircraft information, availability of seats, departure and arrival cities, gate information, and schedule changes. One or more other databases may be accessed by reservation system 18 for data related to other forms of travel and/or shipping and entertainment, for example. It should be noted that the concept set forth herein contemplates arrangement and storage of data that may vary from what is described above.

Speech reservation change system 16 may be in communication with a ticket re-pricing and reissuing system 24. Ticket re-pricing and reissuing system 24 is operable to determine the changes to ticket price affected by the change in itinerary desired by the customer. System 24 also reissues the ticket, if applicable. The new ticket is preferably an electronic ticket that can be transmitted electronically, such as in an electronic mail message. However, a paper ticket may instead be issued. Upon the completion of an itinerary change, a change notification system 26 may deliver or transmit a notification to the customer to further confirm the change in the plans. An updated itinerary and a receipt for additional fees or fares charged or refunded to the customer may be sent to the customer in a similar manner. The change notification may be an electronic mail message or text message delivered to an electronic device of the customer's choosing. For example, the notification may be delivered to a portable communication device 28 such as a mobile telephone, personal digital assistant, pager, laptop computer, notebook computer etc., and/or a desktop device such as a landline telephone, facsimile machine, answer machine, personal computer 30, etc. or may be a paper document.

A monitor system 32 may be used to monitor the operations of speech reservation change system 16. For example, monitor system 32 may record the number of times callers are transferred by a call transfer interface 34 to a reservation representative 36 or another human operator. Monitor system 32 may record the number of or type of errors a caller encounters. Monitor system 32 may also make note of where in the menu or speech reservation logic flow the customer is transferred out to call transfer interface 34. A call may be transferred because the customer is not able to navigate the menu system and make the proper selections, the customer is requesting an itinerary change that requires human intervention, or the customer is requesting the transfer to a human operator, for example. The caller's reservation information may be forwarded to the reservation representative 36 when the call is transferred.

It should be noted that FIG. 1 provides but one example of a functional grouping or implementation for an interactive voice-activated reservation system 10 that permits passengers to change some aspect of their reservation such as the flight date, time, departure city, and/or arrival city, connecting city, booking class or fare paid. Further, components of system 10 may be implemented in hardware, software or a combination thereof.

FIG. 2 is a simplified flowchart of an embodiment of an interactive voice-activated reservation method 40 that is operable to permit a user to change his/her reservations using a voice-activated telephone interface. The user may change the flight date, time, departure city, booking class, fare paid, connecting city and/or arrival city, for example, without having to make these change requests during a certain limited time window when reservation representatives are available. Further, the ubiquitous nature of mobile telephones makes it readily available, unlike other interface means such as specialized kiosks or the Internet.

Referring to FIG. 2 with occasional references to components shown in FIG. 1, interactive voice-activated reservation system 10 first receives a telephone call from a user in block 42. As described above, this call may be received and answered by interactive voice response system 12, which plays a pre-recorded or automated greeting that enables the caller to confirm that the correct telephone number has been dialed and connected. An audio menu of available options is announced to the caller. The caller may also be given the option to be forwarded to a human operator at this point, if desired. For example, the audio greeting and announcement may say, "Hello, welcome to American Airline's automated voice-activated itinerary system. You may use this system to change your itinerary. Please state your reservation identifier or push zero or say 'Agent' to reach a reservation representative." As shown in block 44, the caller is prompted for the reservation identifier. The reservation identifier may be any alphanumeric string that is used to identify the passenger and/or the reserved flight(s). The reservation identifier may be an index that is used to look up a passenger name record and flight information associated with the reservation. The reservation identifier may alternatively be the name of the passenger, a unique frequent flier membership number in combination with travel date, city, the caller's telephone number, or some other unique alphabet and/or numeric string. The caller may enter the reservation identifier by using the keypad of the telephone or by spoken word. In block 46, the reservation identifier is received and repeated to the caller for confirmation.

Optionally for security purposes, the caller may be further prompted in block 47 to provide a pass code such as a password, keyword, zip code or some unique verification number in order to proceed to change the reservation. For example, the caller may be asked to use the telephone keypad to enter an agreed-upon four-digit code. Alternatively, the caller may be asked to verbally utter an agreed-upon code word or phrase. If the caller is not able to provide the password or if the system is unable to understand the caller's input, the caller is forwarded to a reservation representative for assistance.

Upon confirmation of the reservation identifier and optionally the security password, passenger and information related to the reservation identifier may be accessed and services available to the passenger may be qualified in block 48, if applicable. For example, if the caller has a reservation that has not yet been ticketed, then this interactive voice-activated reservation service may not be available to the caller to alter his/her reservation. If the passenger record shows that the passenger requires some special assistance, for example, the caller may also need to be assisted by a human reservation representative. Therefore, in block 48, one or more conditions are checked to determine whether the caller may proceed. Those callers who cannot take advantage of this voice-interactive system are forwarded to reservation representatives 36 for assistance.

In block 50, the voice prompt asks the caller to provide the date of the segment/service to be changed. For example, the voice prompt may ask, "What is the date of the flight you are interested in changing?" In response, the caller speaks the date of the flight, which is received and used to look up the flight information associated with the information in the passenger's reservation. In block 52, method 40 confirms by providing a vocalization of the date and departure and arrival cities of the flight indicated by the caller. For example, the voice prompt may say, "Let me confirm. You would like to change your flight from <City> to <City> on <Date>. Did I get that right? Please say Yes or No." If the caller responds with a "No" or some other negative response, then the previous prompt for the date of the flight is repeated.

If the flight requested by the caller has had a schedule change, that information is provided to the caller. For example, the verbiage may be, "Before we continue with your change request, I would like to advise you of a schedule change that has taken place to your itinerary. Your flight on <Date> is now departing <City> at <Time>. Would you like to continue with the change request?" If the caller continues with the change request, in block 54, a voice prompts for the type of change that is desired by the caller. For example, the voice prompt may ask, "What would you like to change, the date, the time or both?" In response, the caller's verbal response of the type of change is received in block 56. In response to the caller's reply, method 40 prompts for the change desired in block 58. For example, if the caller desires to change the date of the flight, then the voice prompt may ask, "What is the new date you would like to travel?" The caller's response is received and repeated for confirmation in block 60. Method 40 contemplates a verification logic that checks the caller responses. For example, if the caller responds with a new date of a return flight that occurs before the date of the outgoing flight, then the caller is prompted again for the new date.

In block 62, method 40 searches flight database 22 for the availability of a new flight or class of service (first, business, coach) that satisfies the caller's request. In block 64, a voice feedback to the caller regarding the new flight's availability is played. For example, the voice prompt may say, "Ok, I have a flight departing <City> on <Date> at <Time> and arriving <City> at <Time>. This is a nonstop flight. Please confirm if this is the flight you want." In block 66, the caller's confirmation is received.

After the system has the new flight information and it is confirmed by the caller, a determination may be made of the fare difference between the original flight and the new flight and any additional applicable fees in block 68. This fare difference and additional applicable fees information is provided to the caller in block 70 and a confirmation for the change is solicited in block 72. An example verbiage is: "The total amount due is $100.00. This is an itinerary change fee, with no difference in the air fare. Please say Yes if you want to make this change, No if you do not want to make this change, or Repeat to hear this again." If the caller wants to make the itinerary change, then a voice prompt requests payment information in block 74. For example, the voice prompt may say, "Your ticket was issued using a <Credit Card> ending with 1234. Do you wish to use the same card for the changes?" If the caller did not want to use the same card or payment method, then a voice prompt asks for new payment method and information. If there were a refund due to the customer due to the itinerary change, then the voice prompt may say, "Your ticket was issued using a <Credit Card> ending with 1234. We will refund the fare difference to that card." Alternatively, the refund may be in some other form, and that fact will be disclosed to the customer.

Upon receipt of payment information, the flight and/or reservation databases are updated to reflect the change in itinerary of the caller in block 76. For example, a reservation associated with the caller is updated with the change for later validation. Other voice prompts may be provided to solicit updates on special services that the passenger may need. For example, the reservation may show that the passenger has requested vegetarian meals and a seat in the exit aisle. These special requests may be confirmed with the caller and additional feedback provided. Finally, a voice feedback may provide the caller with the updated changes and restrictions associated with the ticket, if applicable, in block 78. For example, the voice announcement may state, "Your new ticket will be reissued electronically, and a new itinerary and receipt will be sent to you for your records via your email address. This is a restricted type ticket with fees for changes. In addition, any cancellations must be made on or before the departure time of the flight being changed, otherwise the ticket has no value. If there is another transaction you would like to make, please say Main Menu. Have a great flight on American Airlines. Goodbye." At this point, the caller may hang up or proceed to the Main Menu where he/she may choose to make other selections. In block 80, an electronic change notification is sent to the caller to confirm the changes made to the travel itinerary. In addition, a receipt for the change fee and fare difference payment or reimbursement may be included in the change notification. The change notification may be transmitted to an electronic device associated with the caller or sent via conventional mail.

Using the interactive voice-activated reservation system and method described above, customers may not only request information, but also alter their itinerary or reservation to better suit their changing plans. For customers who are on the go, the telephone interface is also much more accessible and easy to use than a World Wide Web website or dedicated kiosks. Although it has been described above primarily emphasizing voice inputs from the caller to the system, other input methods such as dual-tone multi-frequency key pad input may be also acceptable at certain points in the application flow. The above described method and system may also be used to change other types of reservations, such as hotel reservations, rental car reservations, tour reservations, cruise reservations, and train reservations, for example. Further, such system and method may also be applicable to reservations associated with theatre shows, concerts and other applications.

An automated method comprises receiving a telephone call from a user, providing a pre-recorded voice prompt for a unique identifier associated with a reservation, receiving the unique identifier and looking up reservation information associated therewith, receiving a voice identification of change desired, and changing reservation information in response to the voice identification of change desired. A voice-activated reservation method comprises receiving a telephone call from a caller, providing an automated voice prompt for a unique identifier associated with a reservation record, receiving the unique identifier, accessing the reservation record associated with the unique identifier, providing an automated voice prompt for an identification of change desired, receiving a voice identification of change desired, and updating the reservation record in response to the voice identification of change desired. A system comprises an interactive voice response module operable to receive a telephone call from a user, providing a voice prompt for a unique identifier associated with a reservation, and receiving the unique identifier, a speech change module operable to look up reservation information associated with the unique identifier, the interactive voice response module operable to further receive a voice identification of change desired, and the speech itinerary change module operable to change the reservation information in response to the voice identification of change desired.

The foregoing has outlined features of several embodiments according to aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An automated method comprising:
   receiving a telephone call from a user;
   providing a pre-recorded first voice prompt to the user for a unique identifier associated with a reservation;
   receiving the unique identifier;
   looking up reservation information associated with the unique identifier;
   providing the user with an update associated with the reservation information;
   receiving a first voice identification of a change to the reservation information desired by the user;
   determining whether the change to the reservation information is permissible;
   providing a first voice feedback to the user with respect to the change to the reservation information;
   providing a second voice prompt to the user for approving the change to the reservation information, wherein such voice prompt is generated during the telephone call;
   receiving a second voice identification from the user approving the change to the reservation information;
   determining whether the change to the reservation information requires a payment;
   providing a second voice feedback with respect to the payment;
   providing a third voice prompt to the user for payment information;
   changing the reservation information in response to the voice identification of the change to the reservation desired;
   providing a third voice feedback to the user with changed reservation information; and sending an electronic message to the user with the changed reservation information.

2. The method, as set forth in claim 1, wherein providing a pre-recorded first voice prompt comprises providing a pre-recorded first voice prompt for a unique identifier associated with a flight reservation.

3. The method, as set forth in claim 1, wherein providing a pre-recorded first voice prompt comprises providing a pre-recorded first voice prompt for a unique identifier associated with a hotel reservation.

4. The method, as set forth in claim 1, wherein providing a Pre-recorded first voice prompt comprises providing a pre-recorded first voice prompt for a unique identifier associated with a rental car reservation.

5. The method, as set forth in claim 1, wherein receiving the unique identifier comprises receiving a dual-tone multi-frequency response.

6. The method, as set forth in claim 1, wherein receiving the unique identifier comprises receiving a voice response.

7. The method, as set forth in claim 1, wherein looking up reservation information comprises using the unique identifier to index into a database for reservation information.

8. The method, as set forth in claim 1, wherein looking up reservation information comprises using a unique membership number to index into a database for reservation information.

9. The method, as set forth in claim 1, wherein looking up reservation information comprises using the caller's telephone number to index into a database for reservation information.

10. The method, as set forth in claim 1, wherein looking up reservation information comprises using a passenger name to index into a database for reservation information.

11. The method, as set forth in claim 1, wherein looking up reservation information comprises looking up a passenger name, flight date and time, and departure and arrival cities.

12. The method, as set forth in claim 1, wherein changing reservation information comprises changing at least one of flight date, flight time, departure city, connecting city, arrival city, booking class, and fare paid.

13. The method, as set forth in claim 1, further comprising issuing a new ticket in response to the changed reservation information.

14. The method, as set forth in claim 1, wherein determining whether the change to the reservation information requires a payment comprises determining any difference in price in response to the change desired.

15. The method, as set forth in claim 1, wherein determining whether the change to the reservation information requires a payment comprises determining any additional applicable fees in response to the change desired.

16. The method, as set forth in claim 1, further comprising updating a reservation information database in response to the change desired.

17. The method, as set forth in claim 1, further comprising providing a voice menu of options to the user.

18. The method, as set forth in claim 1, further comprising:
determining whether there is a restriction on the change desired in response to the reservation information;
forwarding the user to a reservation representative in response to a determination of a restriction; and
forwarding the reservation information to the reservation representative.

19. A voice-activated reservation method comprising:
receiving a telephone call from a caller;
providing an automated voice prompt to the caller for a unique identifier associated with a reservation record;
receiving the unique identifier;
accessing the reservation record associated with the unique identifier;
providing a first automated voice prompt for an identification of a change to the reservation record desired by the caller;
receiving a first voice identification from the caller of the change to the reservation record desired;
providing a first automated voice feedback to the caller as to an update associated with the reservation record;
determining whether the change to the reservation record is permissible;
providing a second automated voice feedback to the caller as to whether the change to the reservation record is permissible;
receiving a second voice identification from the caller approving the change to the reservation record;
determining whether the change to the reservation record requires additional payment;
providing a third automated voice feedback to the caller with respect to the additional payment;
providing a third automated voice prompt to the caller for payment information;
updating the reservation record in response to the voice identification of change desired;
providing a fourth automated voice feedback to the caller with respect to the reservation record; and
sending an electronic message to the caller confirming the change to the reservation record.

20. The method, as set forth in claim 19, wherein receiving the unique identifier comprises receiving a dual-tone multi-frequency response.

21. The method, as set forth in claim 19, wherein receiving the unique identifier comprises receiving a voice response.

22. The method, as set forth in claim 19, wherein accessing the reservation record comprises using the unique identifier to index into a database.

23. The method, as set forth in claim 19, wherein accessing the reservation record comprises looking up a passenger name, flight date and time, and departure and arrival cities.

24. The method, as set forth in claim 19, further comprising searching a database for availability of the change desired.

25. The method, as set forth in claim 19, wherein updating the reservation record comprises changing at least one of flight date, flight time, booking class, fare paid, departure city, connecting city and arrival city.

26. The method, as set forth in claim 19, wherein determining whether the change to the reservation record requires additional payment comprises determining any difference in airfare in response to the change desired.

27. The method, as set forth in claim 19, wherein determining whether the change to the reservation record requires additional payment comprises determining any additional applicable fees in response to the change desired.

28. The method, as set forth in claim 19, further comprising updating the reservation record in a reservation information database in response to the change desired.

29. The method, as set forth in claim 19, further comprising providing an automated voice menu of options to the caller.

30. The method, as set forth in claim 19, further comprising:
determining whether there is a restriction on changing the reservation in response to accessing the reservation record;
forwarding the caller to a reservation representative in response to a determination of a restriction; and forwarding the reservation record to the reservation representative.

31. The method, as set forth in claim 19, further comprising:
  providing a voice prompt for a pass code; and
  receiving and verifying the pass code.

32. The method, as set forth in claim 19, further comprising monitoring reservation change transactions.

33. The method, as set forth in claim 19, further comprising issuing a new ticket in response to the change desired.

34. A system comprising:
  an interactive voice response module operable to receive a telephone call from a user, providing a voice prompt for a unique identifier associated with a reservation, and receiving the unique identifier;
  a speech change module operable to look up reservation information associated with the unique identifier;
  the interactive voice response module operable to further receive a voice identification of a change to the reservation information desired by the user;
  the interactive voice response module operable to provide voice feedback to the user as to any updates associated with the reservation;
  the speech change module operable to determine whether the change to the reservation is permissible;
  the interactive voice response module operable to provide voice feedback to the user as to whether the change to the reservation is permissible;
  the interactive voice response module operable to receive a voice identification from the user of approval to make the change to the reservation;
  the speech change module operable to determine whether the change to the reservation requires any additional payment;
  the interactive voice response module operable to provide voice feedback to the user as to any additional payment;
  the interactive voice response module operable to provide a voice prompt to the user for payment information to pay for any additional payment;
  the speech change module operable to change the reservation information in response to the voice identification of change desired;
  the interactive voice response module operable to provide voice feedback to the user as to updated reservation information; and
  a change notification module operable to send at least one of an electronic mail message or a paper notification to the user confirming the change desired.

35. The system, as set forth in claim 34, further comprising a database storing the reservation information.

36. The system, as set forth in claim 34, further comprising a database storing a passenger name, flight date and time, and departure and arrival cities associated with the unique identifier.

37. The system, as set forth in claim 35, further comprising a ticket issuing module operable to issue a new ticket in response to the changed reservation information.

38. The system, as set forth in claim 34, further comprising a monitor module operable to monitor change transactions.

39. The system, as set forth in claim 34, wherein the speech change module is operable to look up flight reservation information associated with the unique identifier and change the flight reservation information according to the voice identification of change desired.

* * * * *

UNITED STATES PATENT AND TRADEMARK OFFICE
CERTIFICATE OF CORRECTION

| | | |
|---|---|---|
| PATENT NO. | : 7,474,740 B1 | Page 1 of 1 |
| APPLICATION NO. | : 10/927342 | |
| DATED | : January 6, 2009 | |
| INVENTOR(S) | : Carline A. Smith et al. | |

It is certified that error appears in the above-identified patent and that said Letters Patent is hereby corrected as shown below:

Column 10, line 21, change "the system as set forth in claim 35" to --the system as set forth in claim 34--.

Signed and Sealed this

Tenth Day of March, 2009

JOHN DOLL
*Acting Director of the United States Patent and Trademark Office*